(12) United States Patent
Chen et al.

(10) Patent No.: US 7,203,528 B2
(45) Date of Patent: Apr. 10, 2007

(54) MOBILE PHONE WITH A CONNECTOR CAPABLE OF ASSEMBLING BOTH A MICROPHONE AND A COIN BATTERY

(75) Inventors: Hsiao-Wu Chen, Tao-Yuan Hsien (TW); Wei-Ting Liu, Taipei Hsien (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 435 days.

(21) Appl. No.: 10/708,273

(22) Filed: Feb. 20, 2004

(65) Prior Publication Data

US 2004/0166906 A1 Aug. 26, 2004

(30) Foreign Application Priority Data

Feb. 21, 2003 (TW) .............. 92103717 A

(51) Int. Cl.
*H04M 1/00* (2006.01)
(52) U.S. Cl. .............. 455/575.1; 455/572; 455/550.1
(58) Field of Classification Search ............ 455/575.1, 455/572, 550.1
See application file for complete search history.

(56) References Cited

U.S. PATENT DOCUMENTS

| 5,823,820 | A * | 10/1998 | Patel et al. ................. 439/500 |
| 6,068,519 | A * | 5/2000 | Lok ........................... 439/660 |
| 6,183,299 | B1 * | 2/2001 | Ward et al. ................. 439/595 |
| 7,123,735 | B2 * | 10/2006 | Ryan et al. ................. 381/346 |
| 2002/0123375 | A1 * | 9/2002 | Shimazaki et al. ......... 455/575 |
| 2003/0073469 | A1 * | 4/2003 | Wu ............................. 455/569 |
| 2004/0204185 | A1 * | 10/2004 | Snyder et al. .............. 455/574 |

* cited by examiner

*Primary Examiner*—Lester G. Kincaid
*Assistant Examiner*—Fred A. Casca
(74) *Attorney, Agent, or Firm*—Winston Hsu

(57) ABSTRACT

A mobile phone has a circuit board and a connector capable of assembling both a microphone and a coin battery. The connector includes an insulative body having a first engaging sink for positioning the microphone and a second engaging sink for positioning the coin battery. The connector has a first, second, and third conductive terminals for connecting the microphone and the circuit board, and a fourth and fifth conductive terminals for connecting the coin battery and the circuit board.

8 Claims, 6 Drawing Sheets

MOBILE PHONE WITH A CONNECTOR CAPABLE OF ASSEMBLING BOTH A MICROPHONE AND A COIN BATTERY

BACKGROUND OF INVENTION

1. Field of the Invention

The present invention relates to a mobile phone, more specifically, a mobile phone that has a connector capable of assembling both a microphone and a coin battery.

2. Description of the Prior Art

Owing to the rapid development of wireless communication systems, people can access resources, exchange information, and share experiences via a mobile phone anytime and anywhere. In order to deliver information to another far-end user, the mobile phone has a microphone for receiving sound and for transforming the sound into a speech signal. Thus, the speech signal can be encoded and modulated in the mobile phone, then transmitted to the far-end user.

In addition, in order to store key-in data, the mobile phone has an electricity device such as a coin battery to provide the necessary electric power to store these data. Because both the coin battery and the microphone are indispensable parts of the mobile phone nowadays, the conventional mobile phone has to separately reserve space on the circuit board for establishment of different connectors for the battery and the microphone. However, the manufacturers, in order to satisfy consumer's anticipation, still do their best to reduce the size, weight, and costs of the mobile phones. Accordingly, how to reduce the circuit board area is an important topic.

SUMMARY OF INVENTION

It is therefore a primary objective of the claimed invention to provide a mobile phone having a connector capable of accommodating a microphone and a coin battery to reduce the circuit board area, accordingly solving the abovementioned problems of the prior art.

Briefly summarized, a mobile phone according to the claimed invention includes a circuit board and a connector capable of assembling both a microphone and a coin battery. The connector includes an insulative body having a first engaging sink for positioning the microphone and a second engaging sink for positioning the coin battery. The connector has a first, second, and third conductive terminals for connecting the microphone and the circuit board, and a fourth and fifth conductive terminals for connecting the coin battery and the circuit board.

It is an advantage of the claimed invention that claimed invention connector used in the mobile phone is capable of accommodating a microphone and a coin battery, and substituting for two different connectors for respectively accommodating the microphone and the coin battery, so as to reduce the circuit board used area.

These and other objectives of the claimed invention will no doubt become obvious to those of ordinary skill in the art after reading the following detailed description of the preferred embodiment that is illustrated in the various figures and drawings

DETAILED DESCRIPTION

Figure 1:
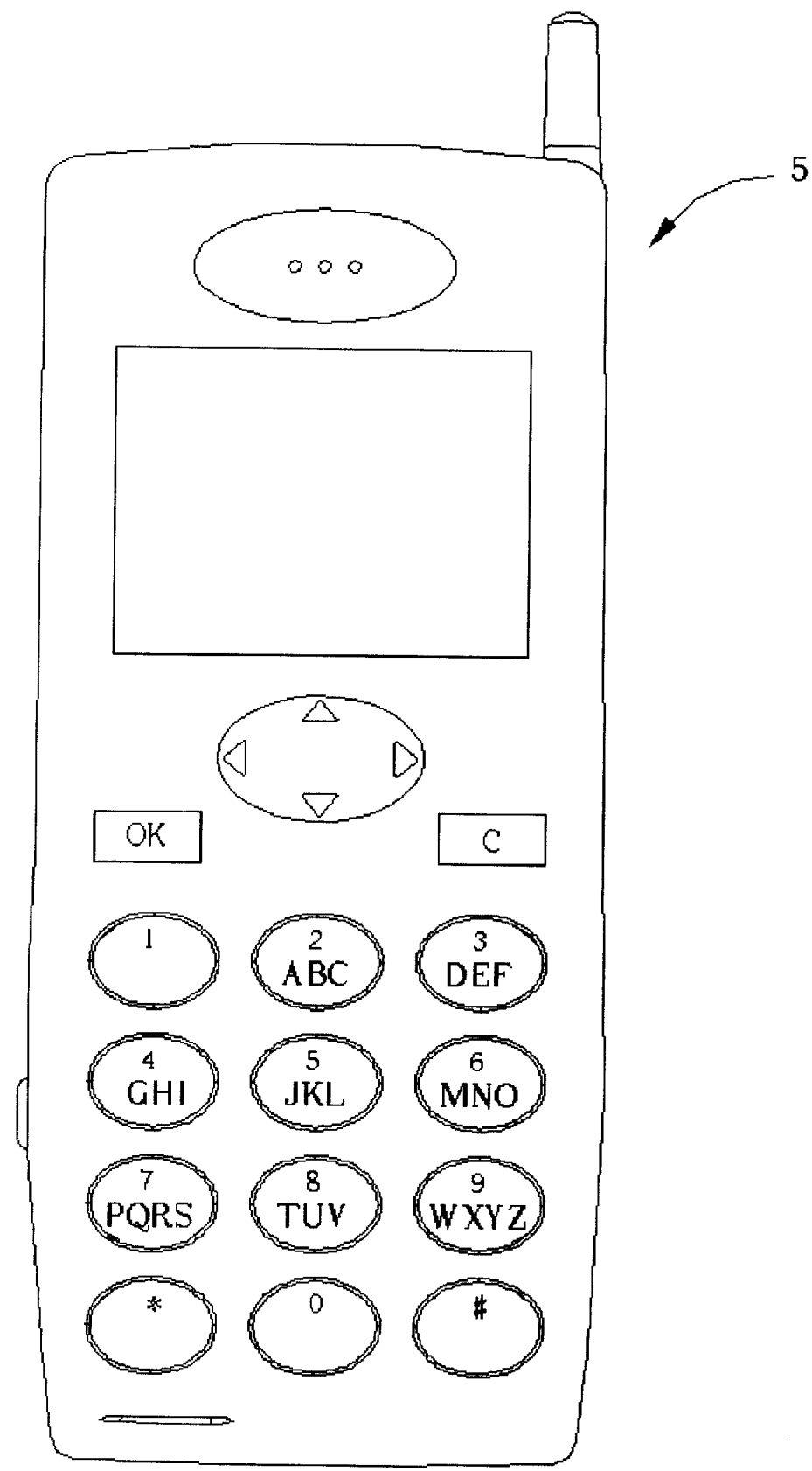
FIG. 1 is a schematic diagram of a mobile phone according to the present invention.
Figure 2:
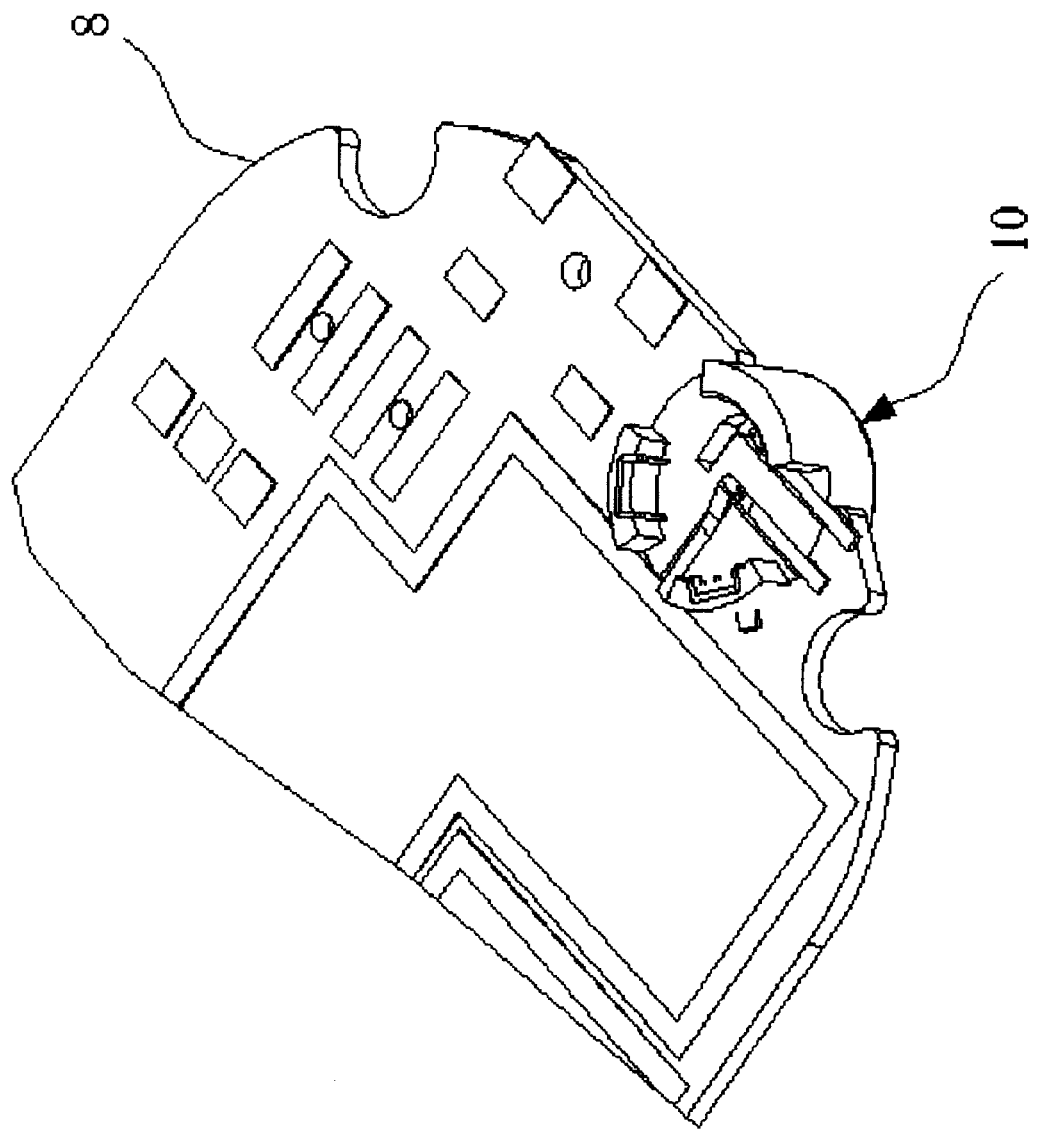
FIG. 2 is a front view of a connector attached to a circuit board within the mobile phone.
Figure 3:
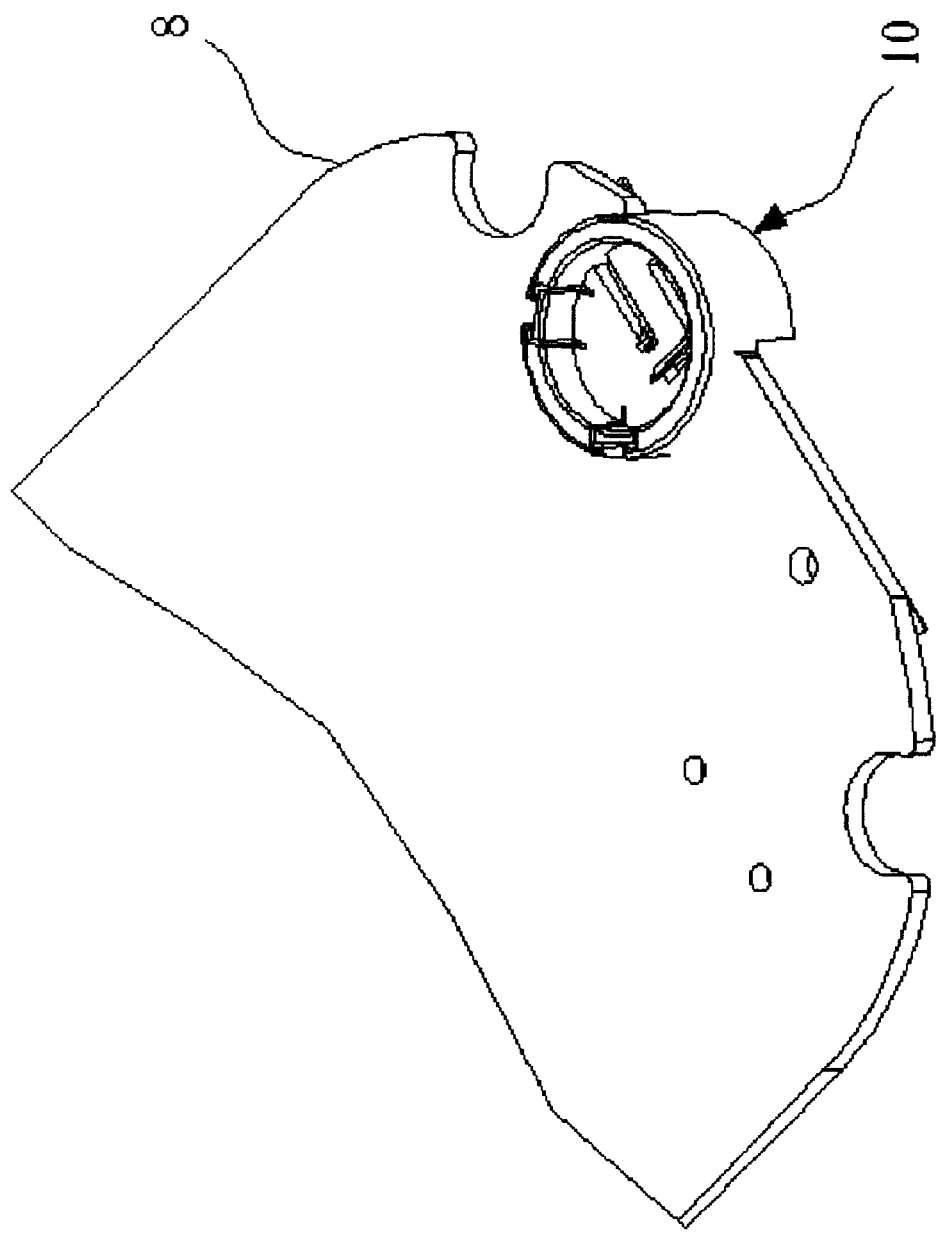
FIG. 3 is a back view of the connector attached to the circuit board within the mobile phone.

Please refer to FIGS. 1, 2, and 3. FIG. 1 is a schematic diagram of a mobile phone 5 according to the present invention. FIG. 2 is a front view of a connector 10 attached to a circuit board 8 within the mobile phone 5. FIG. 3 is a back view of the connector 10 attached to the circuit board 8 within the mobile phone 5. The mobile phone 5 comprises a circuit board 8 and a connector 10 fixed on the circuit board 8 by using SMT technique, or silicone rubber.

Figure 4:
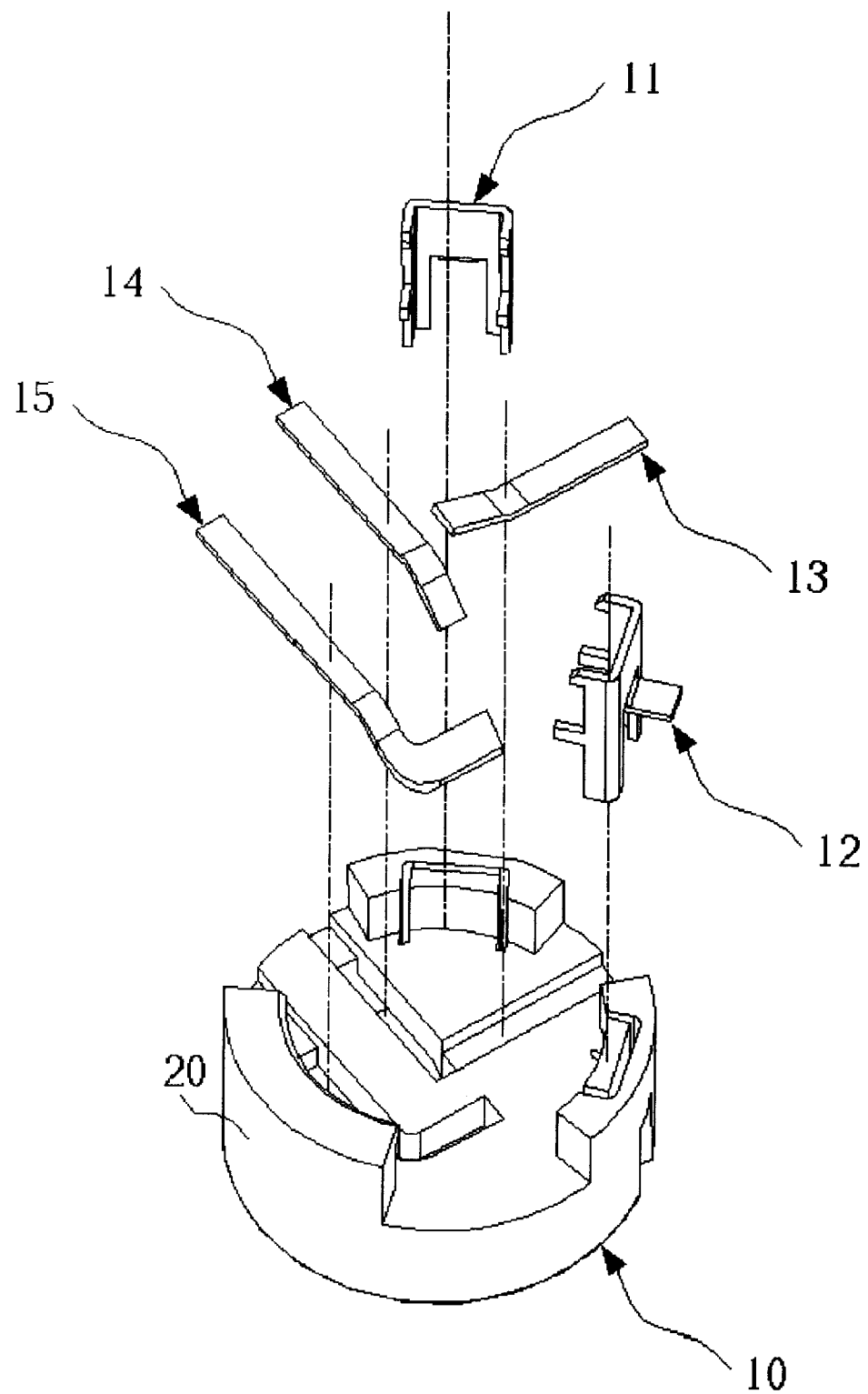
FIG. 4 is a schematic diagram of the connector.

Please refer to FIG. 4, which shows an explosion diagram of the connector 10. The connector 10 comprises an insulative body 20, a first conductive terminal 11, a second conductive terminal 12, a third conductive terminal 13, a fourth conductive terminal 14, and a fifth conductive terminal 15.

Figure 5:
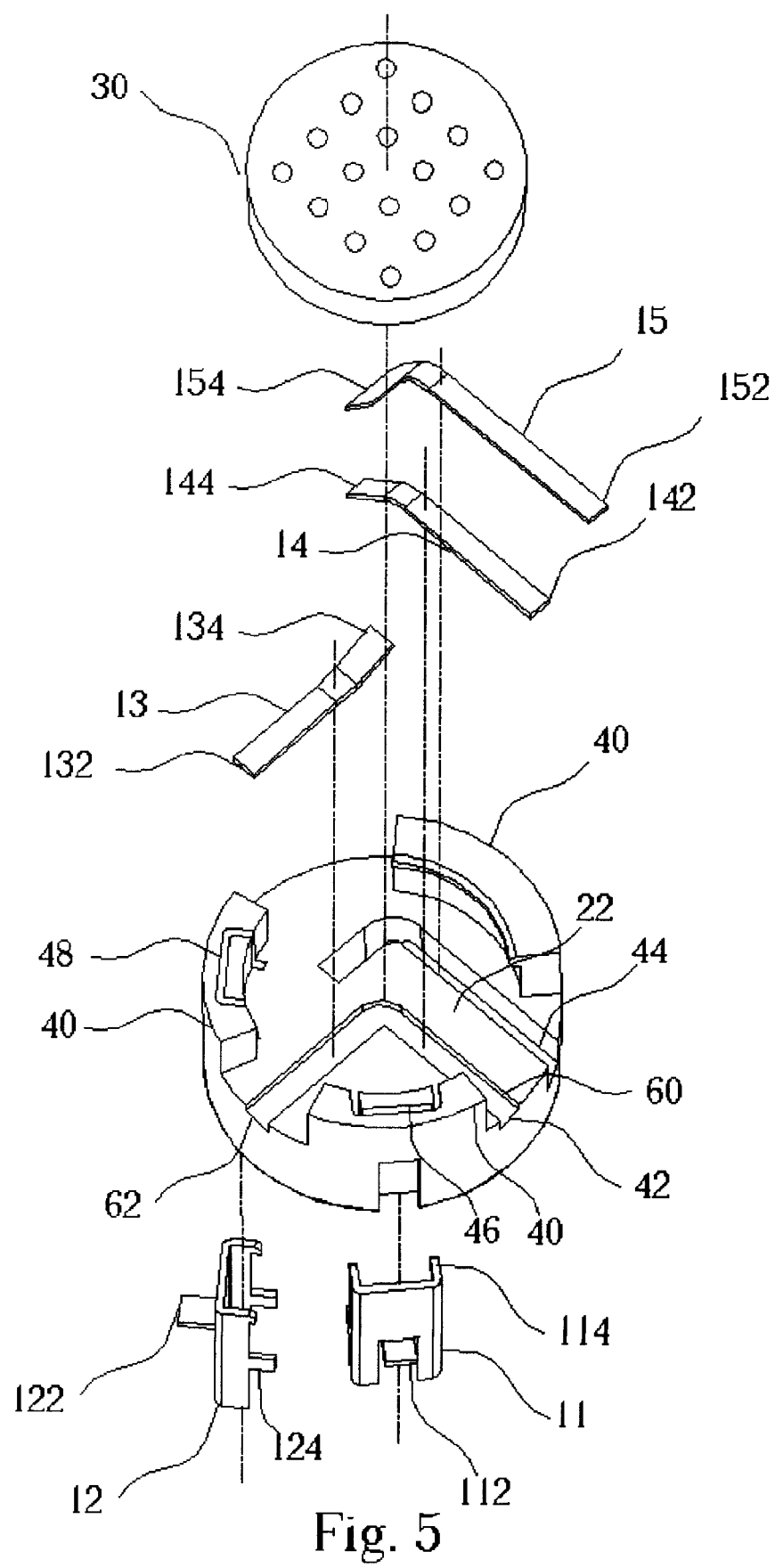
FIG. 5 is a front view of the connector.
Figure 6:
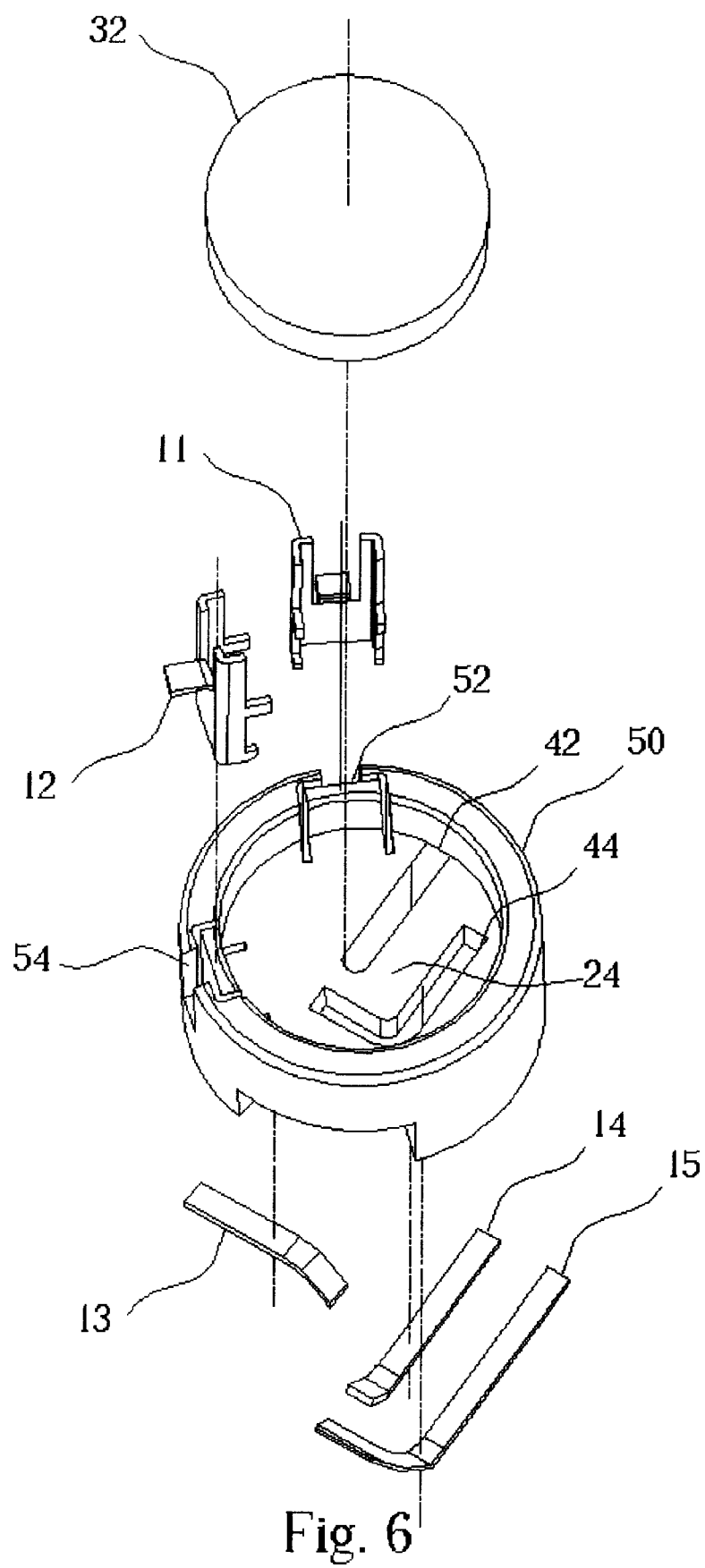
FIG. 6 is a back view of the connector.

Please refer to FIG. 5 and FIG. 6. FIG. 5 is a front view of the connector 10, and FIG. 6 is a back view of the connector 10. The insulative body 20 has a first engaging sink 22 for accommodating a microphone 30, and a second engaging sink 24 for accommodating a coin battery 32, both being located at opposite sides. The first engaging sink 22 comprises a plurality of side walls 40 with two fixing sinks 46, 48, a first trench 42, and a second trench 44. An opening edge 60 of the first trench 42 penetrates through the insulative body 20 to the second engaging sink 24, but the other dent edge 62 of the first trench 42 does not penetrate through the insulative body 20. The second trench 44 penetrates through the insulative body 20. The second engaging sink 24 comprises a frame 50 having two hollows 52, 54 corresponding to the location of the two fixing sinks 46, 48.

The first conductive terminal 11 and the second conductive terminal 12 respectively have tongues 112, 122 and retention portions 114, 124 which are integral on the first conductive terminal 11 and the second conductive terminal 12. After positioning the first and the second conductive terminals 11, 12 from the side of the second engaging sink 24 into the fixing sinks 46, 48, the tongues 112, 122 are stuck out from the two hollows 52, 54 for connecting to the circuit board, and the retention portions 114, 124 are used to connect and to position the microphone 30.

The third conductive terminal 13 comprises a leading portion 132 for connecting with the circuit board on the side of the first engaging sink 22, and a contact portion 134 bent out of the leading portion 132. The third conductive terminal 13 is positioned from the side of the first engaging sink 22 into the dent edge 62 of the first trench 42. At the moment, the bent contact portion 134 must be toward the first engaging sink 22 so as to connect to the microphone 30 while the microphone 30 is positioning onto the first engaging sink 22.

The fourth conductive terminal 14 comprises a leading portion 142 for connecting with the circuit board on the side of the first engaging sink 22, and a contact portion 144 bent out of the leading portion 142. The fourth conductive terminal 14 is positioned from the side of the first engaging sink 22 into the opening edge 60 of the first trench 42. At the moment, the bent contact portion 144 must be toward the second engaging sink 24 so as to connect to the coin battery 32 while the coin battery 32 is positioning onto the second engaging sink 24.

The fifth conductive terminal 15 comprises a leading portion 152 for connecting with the circuit board on the side of the first engaging sink 22, and a contact portion 154 bent out of the leading portion 152 toward the opposite side of the circuit board. The fifth conductive terminal 15 is positioned from the side of the first engaging sink 22 into the second trench 44. At the moment, the bent contact portion 154 must be toward the second engaging sink 24 so as to connect to the coin battery 32 while the coin battery 32 is positioning onto the second engaging sink 24.

In contrast to prior art, the present invention connector used in the mobile phone is capable of accommodating a microphone and a coin battery, substituting for two different connectors for respectively accommodating the microphone and the coin battery, so as to reduce the circuit board used area.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A mobile phone comprising:
    a circuit board; and
    a connector comprising:
        an insulative body having a first engaging sink for accommodating a microphone, and a second engaging sink located opposite the first engaging sink for accommodating a coin battery, wherein the microphone and the coin battery are both flat, are disposed on opposite sides of the insulative body, and are parallel to each other and the insulative body;
        a first conductive terminal, a second conductive terminal, and a third conductive terminal, each for connecting the microphone and the circuit board; and
        a fourth conductive terminal and a fifth conductive terminal, both for connecting the coin battery and the circuit board.

2. The mobile phone, of claim 1 wherein the first engaging sink comprises at least a side wall having two fixing sinks for fixing the first conductive terminal and the second conductive terminal.

3. The mobile phone of claim 1 wherein the second engaging sink comprises a frame having two hollows corresponding to the location of the two fixing sinks.

4. The mobile phone of claim 3 wherein both the first conductive terminal and the second conductive terminal have a tongue on one side, stuck out from the two hollows for connecting to the circuit board, and have a retention portion on the other side for connecting and positioning the microphone, the tongue and the retention portion being integral on the first conductive terminal and the second conductive terminal.

5. The mobile phone of claim 1 wherein the first engaging sink of the insulative body has a first trench with one edge penetrating the insulative body for accommodating the fourth conductive terminal, with the other edge not penetrating the insulative body for accommodating the third conductive terminal, and a second trench penetrating the insulative body for accommodating the fifth conductive terminal.

6. The mobile phone of claim 1 wherein the third conductive terminal comprises a leading portion for connecting with the circuit board on the side of the first engaging sink, and a contact portion, bent out of the leading portion toward the opposite side of the circuit board, for connecting with the microphone on the side of the first engaging sink.

7. The mobile phone of claim 1 wherein the fourth conductive terminal comprises a leading portion for connecting with the circuit board on the side of the first engaging sink, and a contact portion, bent out of the leading portion toward the opposite side of the circuit board, for connecting with the coin battery on the side of the second engaging sink.

8. The mobile phone of claim 1 wherein the fifth conductive terminal comprises a leading portion for connecting with the circuit board on the side of the first engaging sink, and a contact portion, bent out of the leading portion toward the opposite side of the circuit board, for connecting with the coin battery on the side of the second engaging sink.

* * * * *